Jan. 27, 1970  E. C. LONGARINI  3,491,715
MEAL SCHEDULING APPARATUS
Filed Feb. 26, 1968  3 Sheets-Sheet 1
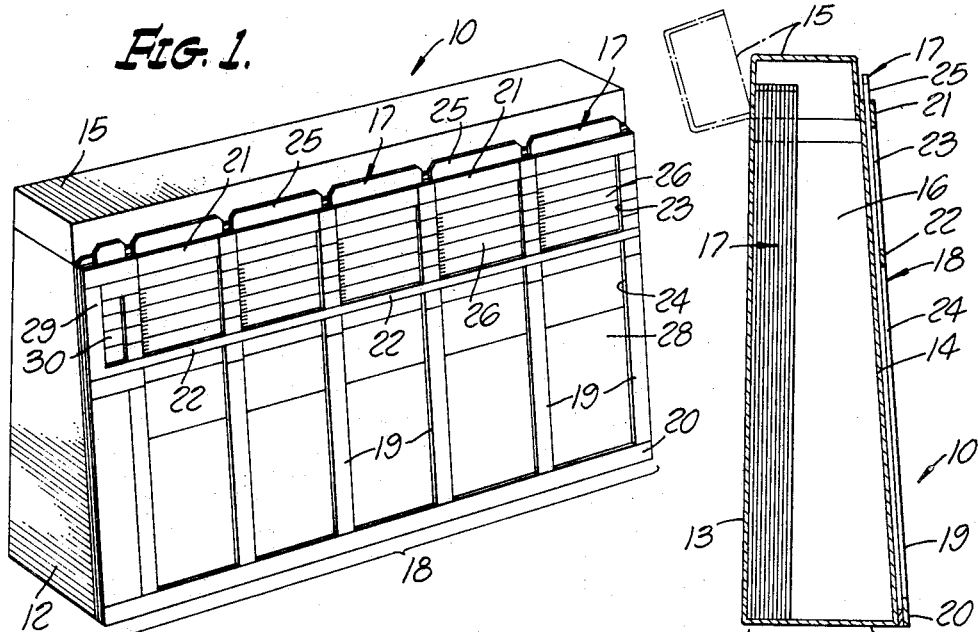
Fig. 1.
Fig. 3.
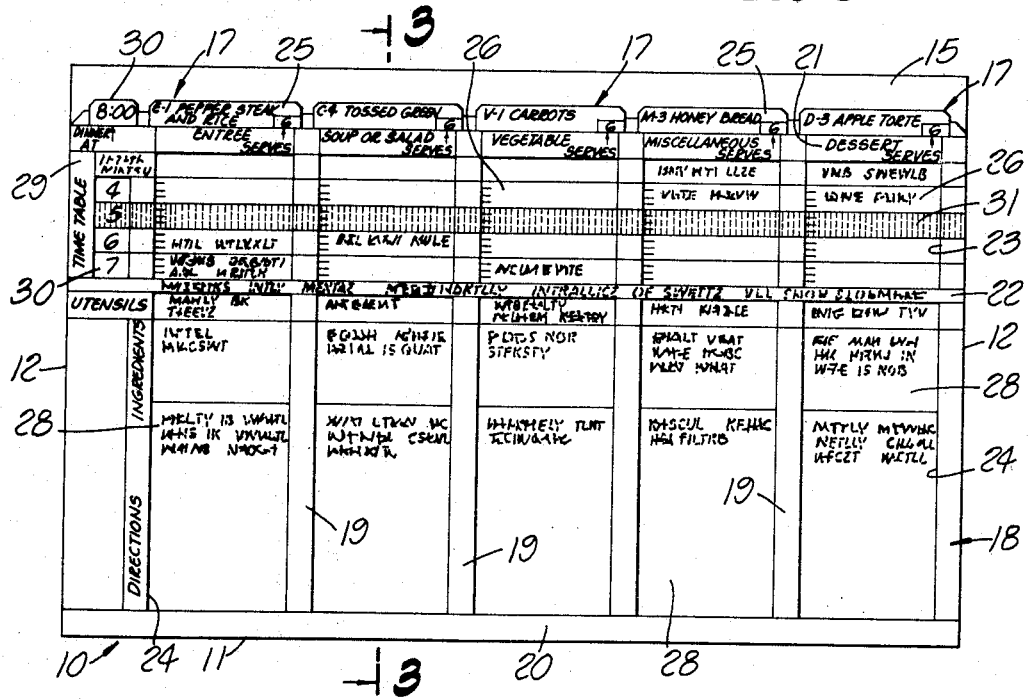
Fig. 2.
INVENTORS
EDMOND C. LONGARINI
BY KENDRICK AND SUBKOW
ATTORNEY

INVENTORS
EDMOND C. LONGARINI
BY KENDRICK AND SUBKOW
ATTORNEY

Jan. 27, 1970     E. C. LONGARINI     3,491,715
MEAL SCHEDULING APPARATUS
Filed Feb. 26, 1968     3 Sheets-Sheet 3
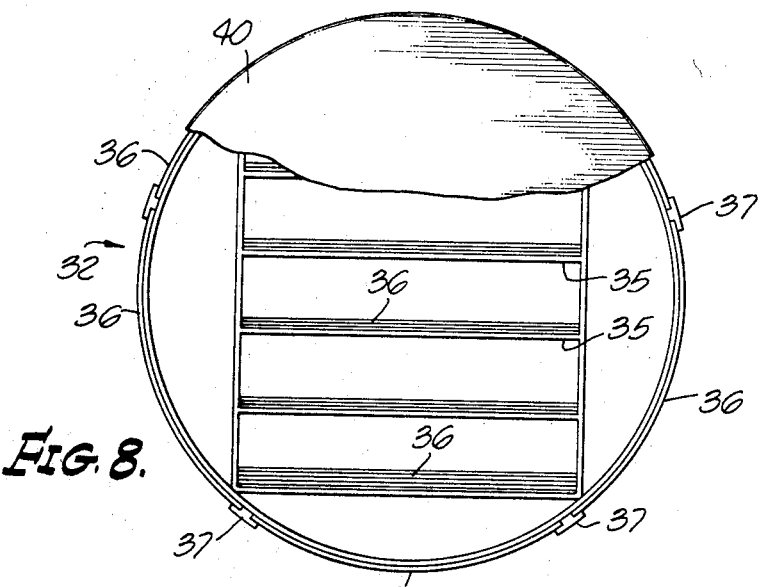
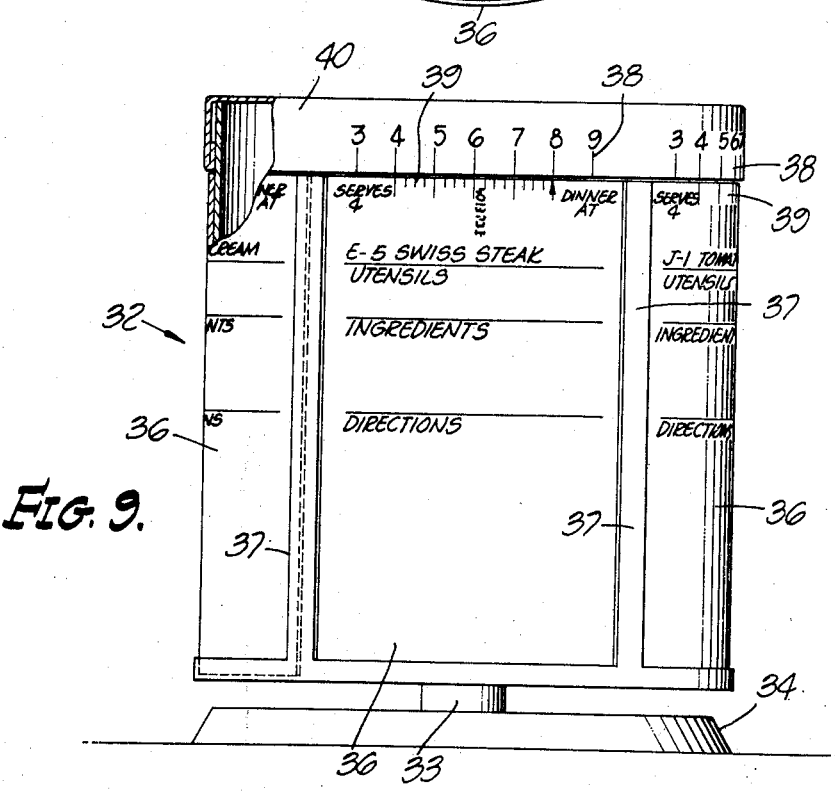
INVENTORS
EDMOND C. LONGARINI
BY KENDRICK AND SUBKOW
George J. Netter
ATTORNEY

United States Patent Office 3,491,715
Patented Jan. 27, 1970

3,491,715
MEAL SCHEDULING APPARATUS
Edmond C. Longarini, Thousand Oaks, Calif., assignor to Revell, Incorporated, Venice, Calif.
Filed Feb. 26, 1968, Ser. No. 708,217
Int. Cl. G09f 19/14
U.S. Cl. 116—131                                11 Claims

ABSTRACT OF THE DISCLOSURE

Ingredients, utensils required and preparation instructions are provided on individual cards for each course of a desired meal. Each card includes calibrated indicia of time necessary to prepare the associated course. The cards are arranged in a display device such that the timing indicia of the different cards are located for ready comparative examination, and in cooperation with preselectable desired mealtimes carried by the display device provides complete data as to the precise times for intiating and completing the various processing steps for each course. All other information on the cards is commonly and associatively displayed for the assistance and convenience of the cook.

---

The present invention relates generally to meal planning and scheduling apparatus, and, more particularly, to such apparatus for providing cooking instructions, utensils and ingredients required, and time scheduling information for each and all courses of a meal to be completed at a preselectable time.

BACKGROUND OF THE INVENTION

In preparation of a meal composed of a number of individual courses, it is necessary not only to obtain the different ingredients and cooking utensils, but also to decide on an appropriate time schedule for preparation of the different courses in order to have the meal completed at some particular desired mealtime. For an inexperienced cook, the scheduling can be an especially difficult undertaking, due not only to general unfamiliarity with cooking techniques, resulting in misjudgment of how long it takes to accomplish particular cooking or preparation steps, but also because of forgetting one or more of the steps, or finding that the allotted time requires more than one thing to be done at the same time. Even for an experienced cook, when one or more courses of a planned meal are new or untried recipes, the scheduling problem to complete the meal at a particular time can be perplexing. Also, where the novice cook is accustomed to preparing meals for a particular mealtime, when suddenly confronted with the requirement for a different mealtime, it may be found that merely shifting a familiar schedule earlier or later is confusing.

It is, therefore, a primary aim and object of this invention to provide meal planning and scheduling apparatus that displays in a common associative manner the various requisites of a meal, and indicates the time for initiation of each of the meal preparation steps for completion at a preselectable mealtime.

Another object of the invention is the provision of meal planning and scheduling apparatus in which various course recipes may be readily selected at will and with the appropriate scheduling information immediately obtained.

A further object of the invention is the provision of apparatus described in the above objects in which each course recipe is provided on selected portions of a card also including calibrated timing information for cooperative display with such cards for other courses in the apparatus to show precise time extent and time of initiation for the different courses.

Other objects and advantages of the invention will be apparent to those skilled in the art upon reference to the description provided herein and the accompanying drawings.

SUMMARY OF THE INVENTION

A mounting and supporting standard has a common receiving and display surface on which individual cards, one for each course of the planned meal, are mounted for common and associative display. Each of these cards includes printed information as to utensils required to prepare the particular course, ingredients of the different courses and full instructions for preparation. In addition, timing information is provided on each of the cards which is calibrated with a mealtime selector carried by the mounting standard to directly display the time for initiation and time extent required for preparation of each of the courses. Selection of the desired mealtime automatically relates the time indications on the cards of the desired courses to a new initiation time corresponding to completion at the desired mealtime. The interior of the mounting and supporting standard is adapted to store the course cards when they are not being used.

A modified form of the invention contemplates forming the mounting standard as a hollow cylinder with its axis mounted vertically for rotation on a base with the various course cards removably mounted on the peripheral surface durin guse. The cards are so dimensioned as to permit a supply of them to be radiallydisposed within a compartment in the interior of the cylindrical mounting standard.

DESCRIPTION OF THE DRAWINGS

FIGURE 1 is a perspective view of one form of the invention.

FIGURE 2 is an elevational view, slightly enlarged, of the apparatus of FIGURE 1, illustrating the respective scheduling and planning information available and the relative location of the various structural elements thereof.

FIGURE 3 is a sectional side elevational view of the apparatus of FIGURES 1 ane 2, taken along the line 3—3 of FIGURE 2, showing storage of meal course cards.

FIGURES 8 and 9 depict an alternate embodiment of the invention.

DESCRIPTION OF THE INVENTION

Figure 4:
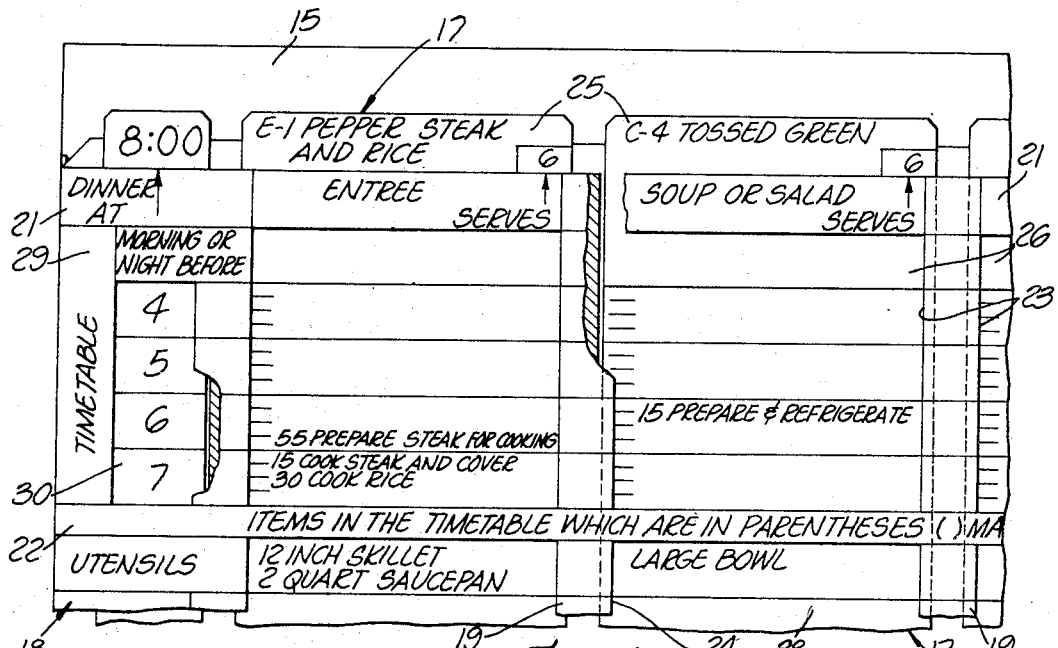
FIGURE 4 is a greatly enlarged, sectional, partially fragmentary view of the apparatus of FIGURES 1 and 2, particularly showing the time scheduling part of the apparatus.

With referenlce now simultaneously to FIGURES 1, 2 and 3, the meal planning and scheduling apparatus of the invention is indicated generally at 10. The apparatus is seen to comprise a hollow, generally boxlike support structure having a lower wall 11, end walls 12, a rear wall 13 and front wall 14. The wall 14 is tilted back or disposed angularly to wall 13, such that when the apparatus 10 is standing upright resting on the lower wall 11, the wall 14 faces slightly upwardly. A cover 15 is pivotally mounted on the upper edge of the back wall 13 for opening and closing movement over the otherwise open top of the apparatus.

The interior 16 of the apparatus is hollow for receiving a plurality of course cards 17, each of which is of generally elongate, rectangular shape and constructed of relatively thin cardlike material. As will be more particularly described later herein, each course card 17 includes written information pertaining to a particular course of a meal. When the apparatus of the invention is not in use, it is contemplated that all of the cards 17 are stored within the interior 16 and the cover 15 is closed (solid line depiction in FIGURE 3).

A display rack 18 is provided on the outwardly directed surface of the wall 14 for receiving a selected plurality of course cards 17 and securing the same in upright readable position. More particularly, the rack 18 includes a plurality of elongated, spaced guides 19, secured together into an integral framelike structure by a single lower horizontal support 20, commonly engaging the lower extremities of each guide and a plurality of horizontal separators arranged in two sets, 21 at the upper extremity of the guides and 22 spaced downwardly from the guide upper extremity.

Each guide 19 includes a slot along the longitudinal edges thereof for receiving the edge of a card 17. The areas 23 and 24 between the horizontal support and guides are so dimensioned relative to the card 17 as to allow the printed information on the cards to be exposed so that the cook may read them.

Figure 5:
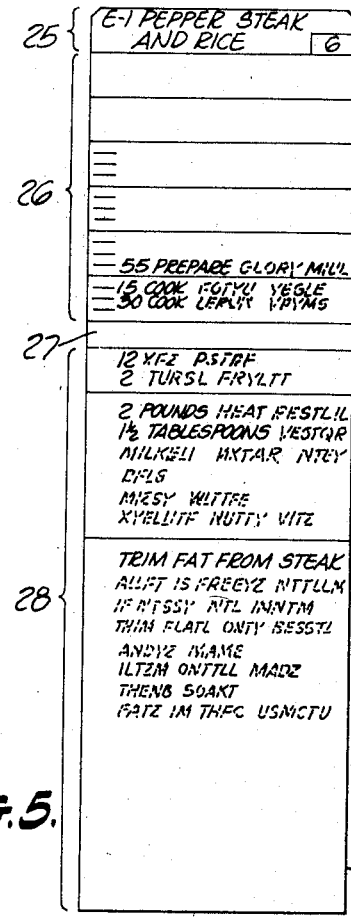
FIGURE 5 is an enlarged plan view of an individual course card containing general information and instruction pertaining to a particular course and calibrated time scheduling indicia.

As is shown best in FIGURE 5, each card 17 includes a variety of printed information arranged in lines across the card short dimension, and which, although differing in content for each of the cards, is laid out in the same general plan for all cards. The top margin of the card is provided with information 25 identifying a particular course, such as, for example, PEPPER STEAK AND RICE. This margin 25 extends above the horizontal support 21 when the card is received within the associated slots of the guides 19.

On working down the card from the margin 25, the next region 26 includes a plurality of gradated lines at the left of the card, which coact with other time calculating apparatus to be discussed later herein for apprising the cook of time for preparation initiation and required time to complete the various steps involved in preparing the particular course of that card. For example, on the card shown in FIGURE 5, it is indicated that at five minutes before the hour (the particular hour being indicated by the calculating apparatus to be described later herein) preparation is initiated and at fifteen minutes after the same hour, certain other steps must be taken.

The blank area 27 does not include written information since when the card is in the rack 18 this portion is covered by a separator 22. Similarly, the uppermost portion of the region 26 on the card is devoid of printed matter since it will be under an element 21.

The lowermost portion of the card containing written instructions is shown at 28 and includes information pertaining to foodstuffs and utensils required as well as special instructions as to preparing or serving. The portion 28 will register with the exposed area 24 when the card is in the rack.

As shown in FIGURES 2 and 4, each horizontal element 21 is printed with identification as to what kind of course should be inserted therein. For example, going from left to right as shown, the first course card is an ENTREE, the second is a SOUP OR SALAD, and so on. Also, on these same horizontal elements is the word SERVES with an arrow pointing at a number printed on the card, which is the normal number of persons that the recipe on the card serves.

In the upper lefthand corner region of the rack 18, there is provided a means 29 for receiving and displaying a selectable mealtime indicator 30 through a centrally located window. The means 29 is so positioned that numerical indicia on the indicator 30 is aligned with the calibrated time gradations in the regions 26 of each of the cards 17. The outer surface of the means 29 has full printed identification showing what the selected time for dinner is and pointing out that the hour indications in the window can be for the morning or night before, for example.

Figure 6:
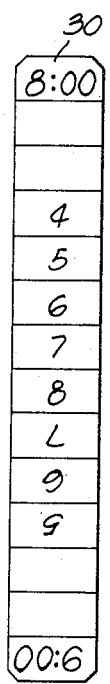
FIGURE 6 is a plan view of one form of mealtime selector for use with the apparatus of this invention.

FIGURE 6 shows in enlarged view, the mealtime selector 30 or use in the present invention. In the form depicted, it is of generally elongated, rectangular striplike shape, each end of which is printed with a desired mealtime, e.g., 8:00 at one end and 9:00 at the other. The numbers in the central region are the immediately preceding four hours for the selected mealtime, which numbers are visible through the window of the means 29. That is, with the mealtime selected being 8:00, the numbers 4, 5, 6 and 7 standing for the corresponding hours preceding 8:00 are displayed as shown in FIGURE 4. Experience has shown that for by far the majority of cooking recipes, four hours is sufficient time within which to complete preparation including cooking.

As illustrated in FIGURES 2 and 4, the horizontal lines separating the diffrent hour designations on selector 30 are aligned with corresponding lines on the region 26 of the course cards 17. Thus, using the example shown in FIGURE 2, by the shaded area, all activities that have to be taken care of between 5:00 and 6:00 can be seen at a glance and will be printed on the cards in the shaded area extending to the right of the numeral 5.

As a further aspect of the invention, it is contemplated that a colored, transparent guide 31 of the same dimensions as shaded area in FIGURE 2 will be overlaid the same areas, to insure that the correct timing information is read on the cards. Although one such colored guide 31 is adequate for this purpose, additional guides may be added, a different color for each hours, for example.

In operation of the apparatus of the invention, the various course cards 17 corresponding to the desired courses are removed from the interior 16 of apparatus 10, inserted into the appropriate slotted receptacles of the rack 18. Next, the mealtime selector 30 is inserted into the means 29 with the desired mealtime hour extending outwardly of the top. Now, not only are the respective course ingredients, required utensile and detailed instructions commonly displayed, but also specific timing and scheduling information is made available for immediate and comparative analysis by the cook.

With reference now particularly to FIGURES 8 and 9, there is illustrated an alternate form of the invention. The basic mounting and display standard 32 comprises a hollow cylinder with a closed lower end at which the cylinder is journaled as at 33 for axial rotation on a base 34. The interior of the cylinder includes a plurality of cubicles 35 in which course cards can be stored when not in use.

The various course cards 36 are removably mounted on the exterior surface of the cylindrical standard 32 by slotted retaining means 37. The course cards 36 are of the same general construction as the cards 17 used in the first described embodiment, differing essentially in the location of the calibrated time scheduling indicia 38. Thus, in this embodiment, the scheduling indicia are arranged along the upper margin, marking time intervals across the short dimension of the card. Complementary sets of timing information 39 are provided on the uppermost margin of the peripheral surface of the cylinder 32, disposed directly opposite the indicia 38 of the various cards 36 and calibrated therewith.

The uppermost end 40 of the cylinder 32, which includes the timing information 39 thereon, is rotatably secured to the remainder of the drum 32. Thus, in making a selection of a desired mealtime, the end 40 is turned relative to the remainder of the cylinder 32 such that the rightmost timing indication lines on each of the cards is lined up with the desired mealtimes. In fact, the different cards 36 are so mounted on the outer surface of the cylinder 32 that lining up of the time indications 38 with the time information 39 on any one of the cards automatically results in a corresponding alignment for the other cards. For example, as shown in FIGURE 8, the figure 8:00, standing for 8 o'clock, is vertically aligned over the rightmost figure, which automatically calibrates the timing indications 38 for the various cards to indicate at what time the various procedural steps for the various courses should be undertaken and the time required for their completion.

Figure 7:
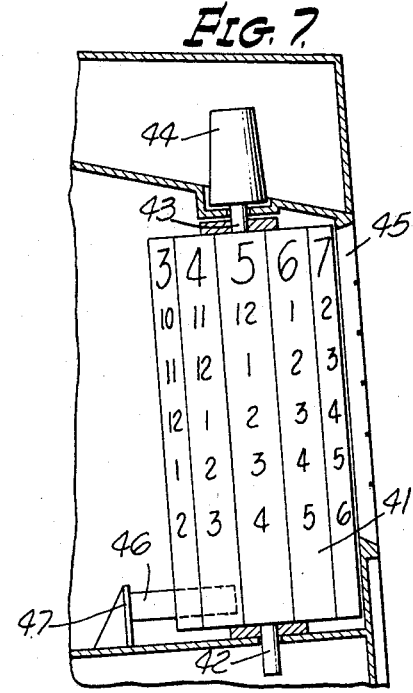
FIGURE 7 is an alternate form of mealtime selector.

A further form for the mealtime selector is that illustrated in FIGURE 7. Essentially, this mealtime selector consists of a drum-like body 41, mounted for axial rotation as at journals 42 and and 43, when considered for use with the embodiment of FIGURE 1. The peripheral surface of the drum 41 is formed into a plurality of longitudinally extending, flat, rectangular surfaces on which there are designated a selected mealtime at the top (3, 4, 5, 6 and 7) and, immediately below, the preceding five hours. That is, in the case of a desired 5 o'clock mealtime, the longitudinal series of numbers on the respective surface areas are, from top to bottom, 5, 12, 1, 2, 3 and 4. A knob 44 provides for selective adjustment of the drum 41 to display a desired one of the rectangular peripheral areas through a window 45. A flat spring 46, mounted on a stanchion 47, engages lower peripheral surface portions of the drum 41 such that rotation of the drum by the knob 44 is in discrete indexing increments, i.e., from one flat rectangular area to the immediately adjacent such area.

To insure accuracy of reading information on the various course cards, a colored transparent guide 31 is overlaid the respective areas of the cards in the preferred embodiment. As an alternative to this, areas of the cards 17 which have similar type information may be colored the same so that when several such cards are mounted in the display rack, the same colored areas form elongated strips which can be easily identified by the cook, and the possibility of misreading information from adjacent areas is substantially reduced.

The general form and shape of the mounting standard on which the cards and mealtime selector are temporarily and removably secured have been limited in the description to either a generally rectangular boxlike construction or a rotatable cylinder. Although the described embodiments have been found to operate satisfactorily, it is contemplated that other structural forms may be used. For example, if card storage is desired to be remotely located, the remainder of the scheduling apparatus can be made substantially two-dimensional, thereby comprising the front wall 14 and rack 18, with other structures carried on the wall 14 being identical to that in the first described embodiment. In this case, the two-dimensional scheduling apparatus could be hung on a wall or laid flat upon a suitable horizontal surface such as a counter top, for example.

Although only two specific embodiments of the present invention have been described and illustrated herein, many changes and modifications will, of course, suggest themselves to those skilled in the art. These embodiments have been selected for this disclosure of the invention for the purpose of illustration only. The present invention should, therefore, not be limited to the embodiments so selected, the true scope of the invention being defined only in the appended claims.

What I claim is:
1. Meal scheduling apparatus, comprising:
   a support including a common display surface;
   a plurality of cardlike elements, each having printed instructions pertaining to a particular meal course and unspecified timing gradations;
   means for removably securing each of said cards to the display surface of said support with the printed information on said cards commonly displayed; and
   preselectable mealtime indicating means carried by the support display surface having specified timing indicia thereon which are aligned with the timing gradation of the cards, whereby the gradations are specified as to particular times for initiation and preparation of each of said courses to complete the meal at a preselected time, said card securing means comprises spaced slotted members for receiving at least a pair of opposite edges of each card while leaving the central portions of the card containing printed information in exposed readable condition.

2. Meal scheduling apparatus as in claim 1 in which the preselectable mealtime indicating means includes an elongated cardlike member having a desired mealtime imprinted at one end margin and arranged thereunder a set of numbers corresponding to hourly times preceding said desired mealtime, said member being mounted on said display surface adjacent said cardlike elements in such manner to align the set of numbers with the timing gradations.

3. Meal scheduling apparatus as in claim 2, in which transparent window means overlay a given hourly number on the mealtime indicating means and the corresponding timing gradations on each of the cardlike elements.

4. Meal scheduling apparatus as in claim 1, wherein the support comprises a hollow structure of such dimensions as to receive a plurality of the cardlike elements therein.

5. Meal scheduling apparatus as in claim 1, in which the cardlike elements are of generally rectangular elongate construction with printed information arranged in lines across the short dimension thereof, and the timing gradations being grouped into uniform rectangular areas in one region of said cardlike element, said gradations lying along one edge of the element and being aligned with the specified timing indicia on the mealtime indicating means.

6. Apparatus for scheduling preparation of a meal as in claim 1, in which the display surface is disposed at a slight angle to the vertical in tilted-back arrangement, thereby providing display of the various printed information on the cardlike elements and mealtime indicating means in a slightly upward direction.

7. In apparatus for scheduling the preparation of a multicourse meal for completion at a predeterminable mealtime, wherein preselectable mealtime and timing indicia carried on a mounting standard are associatively displayed with individual meal course information cards having calibrated timing marks thereon to cooperatively register specific times for the timing marks, said cards being generally elongate rectangular in form with course name at one end margin, a first region immediately adjacent said one end margin including the timing marks, and a second region on the remainder of the card including required ingredients, utensils and preparation instructions, the first region on the card including the timing marks includes a plurality of uniformly dimensioned rectangular areas extending across the short dimension of the card and said timing marks arranged along the same side of the card, each of said rectangular areas corresponding to an hour, and the rectangular areas of all of said cards being aligned.

8. In apparatus for scheduling the preparation of a multicourse meal as in claim 7, in which select similarly located areas of the first region of each card have identical visual characteristics such that on associative display said areas are immediately identifiable and related to corresponding timing indicia.

9. In apparatus for scheduling the preparation of a multicourse meal as in claim 8, in which respectively similar areas of each card are of the same color and different such areas on the same card are of different colors.

10. Apparatus for indicating a time ordered arrangement of accomplishable events all of which events are required to be completed by a preselectable time, comprising:
   supporting and display means;
   a plurality of cardlike elements including general instructional information and other instructions as to timing of events, said other instructions including undesignated calibrated markings; and said supporting and display means including a plurality of sets of timing indicia for being selectively disposed adjacent the calibrated markings on the cardlike elements, thereby designating particular timing values to said timing markings, the supporting and display means includes a generally drum-like member mounted for rotation about its central axis, the peripheral surface of said member including the sets of timing indicia such that rotation of the member selectively disposes one set at a time of the timing indicia adjacent the calibrated markings.

11. Apparatus as in claim 10, in which the drumlike member is generally cylindrical in shape and mounted for rotation about its central axis, and has its circumferential peripheral areas formed into a plurality of longitudinally extending flattened surfaces, each of which flattened surfaces includes a set of timing indicia arranged along the long dimension thereof, and there is further provided means resiliently engaging peripheral surface portions of the member such that rotation of the member indexes said member from displaying one set of indicia to that of an immediately adjacent set of indicia consecutively.

References Cited

UNITED STATES PATENTS

| | | | |
|---|---|---|---|
| 2,253,043 | 8/1941 | Nachumsohn | 116—135 XR |
| 3,079,913 | 3/1963 | Nelson. | |

OTHER REFERENCES

Publication: The Good Housekeeping Cook Book, Dorothy B. Marsh, Rinehart & Co. Inc., pp. 424–427.

LOUIS J. CAPOZI, Primary Examiner

U.S. Cl. X.R.

35—24; 40—64; 99—342; 211—46; 235—85